Dec. 25, 1951 W. H. ZINN 2,579,994
NEUTRON DENSITY INDICATOR DEVICE
Filed Feb. 3, 1945
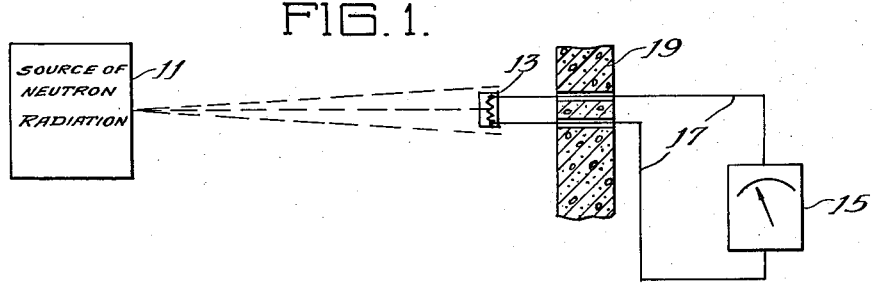
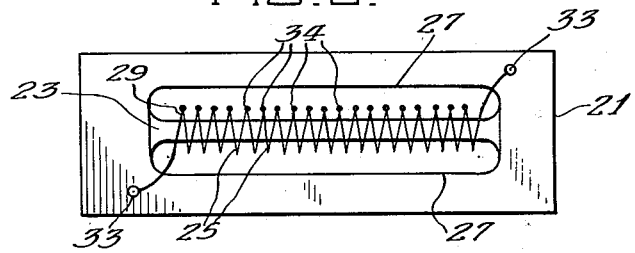
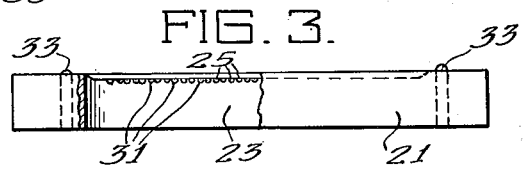
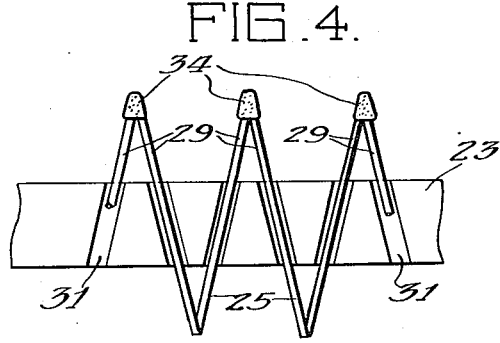
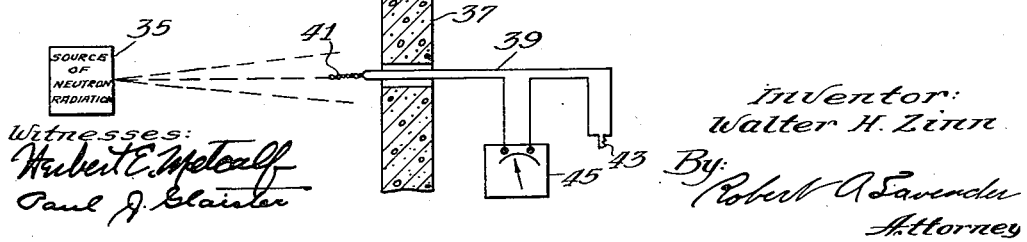
Inventor:
Walter H. Zinn
By Robert A. Lavender
Attorney Patented Dec. 25, 1951

2,579,994

UNITED STATES PATENT OFFICE 2,579,994

NEUTRON DENSITY INDICATOR DEVICE

Walter H. Zinn, Chicago, Ill., assignor to the United States of America as represented by the United States Atomic Energy Commission Application February 3, 1945, Serial No. 576,124

7 Claims. (Cl. 250—83)

The present invention relates to neutron responsive devices and particularly to neutron density indicating means adapted for use in connection with the control and operation of neutronic reactor systems.

A neutronic reactor system, as the term is used herein, constitutes a complete system designed for initiating and carrying out chain nuclear reactions. Such systems are employed in a neutronic reactor wherein neutrons are developed by fission of fissionable materials, such as the $U^{235}$ isotopic content of natural uranium, and reserved for sustaining the reaction, controlled by control apparatus for initiating and controlling the progress of the reaction, and shielding restrained by means for protecting the operating personnel from the radiations developed during the operation of the system.

The power being developed in a neutronic reactor system at any particular instant is, in general, proportional to the neutron density existing at that particular time within the reactor unit, such neutron density being maintained by liberation of new fission neutrons. Neutron density thus provides a convenient basis for monitoring and controlling the operation of such systems, and there is considerable need for a simple, easily operated device that is capable of giving an accurate, continuous indication of neutron density within, or adjacent to, neutronic reactors. The provision of such apparatus is the principal object of the present invention.

It is a further object of the invention to provide neutron density indicating means, in accordance with the stated principal object, which shall have a sufficient sensitivity range that it may be used during the low power output starting-up period of the reactor as well as during periods of normal power output, which shall operate to indicate changes in neutron density with the minimum possible time lag, and which shall give substantially linear response to neutron density variations during its operation.

As will hereinafter appear, these objects are accomplished by the provision of a thermocouple or thermopile device that is temperature responsive to neutron radiation, thereby operating, when subjected to neutron irradiation, to produce thermoelectromotive forces proportional to the density of the radiation. The various novel structural features, constructional arrangements contributing to the successful operation of the apparatus of the invention, and a more complete exposition of its principles and mode of operation will be found in the following description and the acompanying drawings of certain preferred embodiments thereof.

In the drawings:

Fig. 1 is a diagrammatic view of a neutron density indicating means in accordance with the present invention;

Fig. 2 is a more or less diagrammatic, plan view of a thermopile suitable for use in the system illustrated in Fig. 1;

Fig. 3 is a more or less diagrammatic side elevational view, partially cut away, of the thermopile illustrated in Fig. 2;

Fig. 4 is an enlarged fragmentary view showing certain of the constructional details of the thermopile illustrated in Figs. 2 and 3; and Fig. 5 is a diagrammatic view, similar to Fig. 1, showing a modified form of the invention.

In its simplest form, the neutron density indicating means of the present invention comprises a voltage responsive indicating means and a thermocouple or thermopile having its hot junction or junctions positioned to receive neutron radiation from the neutron source whose density it is desired to measure. The thermocouple or thermopile includes means for producing heating at each hot junction when that junction is subjected to neutron irradiation, and by this means the apparatus serves as a thermocouple responsive to neutron density. The means for producing the hot junction heating may comprise a coating of a material having relatively high neutron capture capabilities, either of simple capture or of capture resulting in fission in which instance the associated cold junction may advantageously be located in proximity to the hot junction, or the material may comprise an integral constituent of the hot junction. If the latter arrangement is used, it is almost necessary that the cold junction shall not be subjected to neutron irradiation.

The relative disposition of the parts of a device of the coated hot junction type is shown in Fig. 1. In that view, a source of neutron radiation, which may comprise a neutronic reactor, is illustrated generally at 11. A thermocouple or thermopile unit is illustrated at 13, and an indicating device and suitable connections are illustrated respectively at 15 and 17. The shield for the reactor system is shown at 19. The indicating device 15 may be of the direct reading galvanometer type, or it may comprise a voltage responsive relay or other equivalent means, and the terms "indicating device" or "voltage responsive means" as used herein are intended to include such arrangements.

The thermocouple unit 13 is positioned to receive neutron radiations from the source 11, and the hot junction or junctions thereof are coated with a material which has high neutron capture capabilities of simple capture, or fission capture as indicated above. The constants of the indicating means are so correlated with respect to the thermoelectromotive forces produced by neutron heating at the thermocouple junction or junctions that an indication of neutron density may be had.

Various combinations of materials commonly used for thermocouples may be used in the thermocouple element 13. For example, certain of the alloys of bismuth and tin have been used advantageously in combination with alloys of bismuth and antimony. The chief requirement of the materials is that they shall provide a thermocouple having a response to neutron irradiation which is almost linear and which involves a very slight time interval during its operation while at the same time have high neutron absorption. While bismuth-tin and bismuth-antimony alloys are not very absorbent to neutrons, the hot junction thereof may be coated with absorbent materials so as to be highly absorbent. Another combination of metals giving satisfactory results with coated hot junctions is bismuth and silver. The bismuth-silver combination has the particular advantage that there is very little variation in the sensitivity of the device in response to changes in the ambient temperature, and the high heat conducting properties of silver reduce the recovery time of thermocouples made from these metals to a minimum value.

Various coatings may be applied to the hot junction or junctions of the thermocouple unit 13 in order to obtain the desired neutron responsive characteristics. Uranium oxide is a fairly satisfactory material representative of a material comprising a fissionable isotope. Boron, representative of a simple neutron capture material, proved to be one of the best of the commercially available materials used, although the $U^{235}$ isotope of uranium is considered superior to boron, due to its highly fissionable character, especially for slow or thermal neutrons, and its high thermal conductivity. Among the less satisfactory though usable materials are cadmium and silver.

In selecting materials for the coating or integral constituents of the thermocouple, the degree of heating is determined by the simple neutron capture or fission capture characteristics of the material. The probability of boron, cadmium, and silver in capturing neutrons is very high although they do not suffer fission by such capture. As compared to aluminum, boron and cadmium are, respectively, 9500 and 3300 times as absorbent by simple neutron capture. Silver, while not so absorbent to neutrons as the above metals, nevertheless is approximately 75 times more absorbent than aluminum and has high heat conducting properties which tend to dissipate the heat more rapidly, thereby making the thermocouple unit more sensitive to changes in neutron density as indicated above. The isotopes $U^{233}$ and $U^{235}$, as well as the element plutonium, such as plutonium $94^{239}$, when subjected to neutrons, especially thermal neutrons present in or escaping from a neutronic reactor, fissions with the liberation of approximately two new neutrons, fission fragments comprising new elements, and beta and gamma rays. The fission fragments and beta rays are liberated with great kinetic energy and are principally absorbed by the material comprising the coating or the integral constituent of the thermocouple incorporating the fissionable material, thereby heating the thermocouple and developing an electromotive force proportional to such heating.

The coating may be applied to the hot junction by almost any metal coating procedure. The most convenient mode of application appears to be by means of a lacquer or resinous binder which contains substantial quantities of the high neutron capture material in a finely divided state. Satisfactory boron coatings have been applied to thermocouple junctions by the use of a mixture consisting of amorphous boron dispersed in a binder comprising the lacquer sold under the trade name of Carbonoid-A thinned with acetone. Satisfactory boron coatings have also been applied by the use of a shellac and alcohol mixture as a carrier and binder for the amorphous boron. About 2 parts of boron should be used for each part of binder.

Since the thermoelectromotive forces produced by a single thermocouple are of relatively small magnitude, it is desirable in most instances to employ a thermopile rather than a single thermocouple for the unit 13, and a particularly satisfactory device of this type is illustrated in Figs. 2, 3, and 4. This device includes a flat support 21, having a narrow, elongated, centrally disposed bridge portion 23, and a plurality of thermocouples 25 electrically connected in series and mechanically supported upon the central bridge portion 23.

The main support 21 for the thermopile may be made of any suitable insulating material having low neutron capture capabilities. Among the materials found particularly satisfactory are: Lavite, which is a hydrated magnesium silicate soft and readily machinable in its natural state but easily hardened by baking at about 1000° C., natural soapstone, and Lucite. Graphite may also be used provided that insulation is placed in the grooves 31. Whatever material is used should be substantially unaffected by neutron bombardment. The edges of the bridge portion 23 are defined by slots 27 formed in the support 21. Each of the individual thermocouples 25 making up the thermopile comprises two lengths 29 of relatively fine wire of dissimilar composition joined together so as to provide a series of hot junctions on one side of the bridge and a series of cold junctions on the other. The junctions overhang the edges of the bridge portion 23.

In the particular embodiment illustrated, the bridge portion 23 has a width of about $\frac{1}{32}$ of an inch and a length of about 2 inches. The thermocouple wires 29 have a diameter of about .004 inch, a length of about $\frac{7}{64}$ of an inch, and they are disposed in transverse grooves 31 which are .007 inch deep and which are machined in the bridge. One of the two wires 29 comprising each of the thermocouples 25 is made of a bismuth antimony alloy containing 3 per cent bismuth, and the other wire is of a bismuth tin alloy containing 5 per cent tin. During manufacture, the wires 29 of similar composition are placed in alternate grooves 31. The transverse grooves 31 are inclined slightly relative to a perpendicular to the bridge 23 in order that the ends of the wires 29 shall meet, and the meeting ends are fused together. If desired, a small amount of solder, such as the eutectic alloy of bismuth and tin may be applied to the junctions to facilitate the fusion thereof. Each of the wires 29 should be fastened in place in the associated groove 31 by the application of a suitable cement following the fusion or soldering operation. The electrical connections to the two ends of the thermopile are made by means of a pair of lead terminals 33 which extend through suitable openings in the main support or base 21.

The hot junctions of the thermopile are coated, as illustrated at 34, with the boron lacquer mixture described above. During use of the device, it is intended that it be enclosed within a suitable protective box, which should be of a material having low neutron capture capabilities, such as graphite.

The thermopile construction described in the foregoing constitutes a highly efficient neutron density indicating means. Due to the rather large number of thermocouples used, about 30 in the average structure, sufficient electromotive force is produced even at a low neutron density to give reliably readable indications. Further, the response characteristic of thermocouples constructed of the particular bismuth alloys disclosed is almost exactly linear, and due to the very low heat capacity of the thermopile elements, the response is practically instantaneous throughout the entire operative range of the device. In addition, the low thermal capacity of the thermocouples 25 in combination with the overhanging support arrangement used, which suspends both the hot and cold junctions in air, serves to greatly minimize the time lag in restoring the device to operative condition following sudden changes in neutron density. In fact, operation of such devices has shown that under the most severe conditions likely to be encountered, the time lag in the device will not exceed one second. Extended use of the device indicates that there is substantially no deterioration of the materials of which it is constructed or changes in the calibration over a considerable period of time. Further, changes in the ambient temperature affect the sensitivity only slightly.

In certain instances, it is desired not to use a coated type thermocouple, and it is possible to obtain a thermocouple having good response characteristics to neutron radiation by utilizing a material for one element of the couple which of itself has high neutron capture capabilities. Examples of thermocouples made of materials in which neutron capture results in fission are uranium and tungsten combinations, and uranium and iron combinations. These materials lend themselves to being formed into wires, which are the most convenient manner of constructing thermocouple devices, and the neutron response characteristics are excellent. However, when heating of the thermocouple junction results from neutron capture by a constituent part of the junction rather than by the heating of a coating applied to the hot junction, it is necessary to locate the cold junction where it will not receive neutron radiation.

An arrangement of this type is illustrated diagrammatically in Fig. 5 in which view a source of neutron radiation is indicated generally at 35 and a neutron shield is indicated at 37. The neutron responsive device includes a thermocouple 39 having a hot junction 41 located inside the shield 37, and a cold junction 43 located outside the shield 37 in combination with an indicating means 45 which, as previously stated, may comprise a voltage responsive relay, or the like.

The use of the uncoated junction arrangement has one disadvantage not present in the coated type device. Due to the location of the cold junction some distance from the hot junction, instead of in close proximity thereto as is possible in the case of the coated type arrangement, the thermoelectromotive forces produced by the differences in temperature between the hot and the cold junctions include not only temperature differentials resulting from neutron irradiation, but also those resulting from heating of the hot junction by heat absorption from the ambient medium. In order to correct for this, it may be necessary to measure the temperature of the ambient medium by means of a separate thermocouple which is not responsive to neutron radiation and to apply a correction to the indicated figure. In the coated type construction with both junctions located adjacent to each other, there is a balancing of the thermally produced electromotive forces due to heating of the ambient medium, and as long as both junctions are in proximity to each other, the thermoelectromotive forces applied to the indicating device will be due solely to neutron produced heating.

I claim:

1. Neutron intensity indicating means comprising two members of dissimilar metals joined together to provide a thermocouple, said metals having low neutron capture properties and being capable of developing thermo-electromotive forces at a junction thereof, a coating of non-fissionable material having higher neutron capture properties than the thermocouple members disposed on at least one junction of the thermocouple members, thereby providing a hot junction for the thermocouple.

2. A neutron responsive thermocouple of the class described comprising a member of a bismuth-tin alloy joined to a member of a bismuth antimony alloy, and a coating of a non-fissionable material having higher neutron capture properties than said members applied to every other junction of the thermocouple.

3. A neutron responsive thermocouple of the class described comprising a member of bismuth-tin alloy, containing approximately 5 per cent tin, joined to a member of bismuth-antimony alloy, containing approximately 3 per cent antimony, and a coating of a non-fissionable material having higher neutron capture properties than said members applied to every other junction of the thermocouple.

4. A neutron responsive thermocouple of the class described comprising a member of bismuth joined to a member of silver and a coating of non-fissionable material having higher neutron capture properties than the members of the thermocouple disposed upon every other junction.

5. A neutron responsive thermocouple comprising, in combination, a support member consisting of insulating material, a plurality of pairs of short lengths of dissimilar metal wires supported upon said support member and interconnected forming a plurality of junctions, and a coating of non-fissionable material having higher neutron capture properties than said wires disposed on alternate junctions.

6. A neutron responsive thermopile comprising an elongated, narrow bridge member made of insulating material, a plurality of pairs of short lengths of dissimilar metal wires having a diameter of the order of .004 inches supported transversely upon said bridge member so as to overhang the sides thereof, said pairs of wires being interconnected to provide a plurality of junctions which are in close proximity to each other, said junctions having low thermal capacities, and a coating of non-fissionable material having higher neutron capture capabilities than said wires disposed upon alternate junctions.

7. A device for measuring neutron density comprising, in combination, a neutron shield, a thermocouple having at least one hot junction disposed on one side of said shield and at least one cold junction disposed on the other side of said shield, and a coating of non-fissionable material of higher neutron absorbing capabilities than the thermocouple disposed upon the hot junctions.

WALTER H. ZINN.

REFERENCES CITED

The following references are of record in the file of this patent:

UNITED STATES PATENTS

| Number | Name | Date |
|---|---|---|
| Re. 19,564 | Quereau | Mar. 7, 1935 |
| 650,062 | Gottscho | May 22, 1900 |
| 786,577 | Marsh | Apr. 4, 1905 |
| 1,326,304 | Swan | Dec. 30, 1919 |
| 1,643,582 | Martin | Sept. 27, 1927 |
| 1,891,039 | Barton | Dec. 13, 1932 |
| 2,306,272 | Levy | Dec. 22, 1942 |

FOREIGN PATENTS

| Number | Country | Date |
|---|---|---|
| 391,428 | Great Britain | June 9, 1933 |

OTHER REFERENCES

Edser: Heat for Advanced Students, 1936, page 402.

"The Heat of Fission of Uranium," Henderson, Physical Review, vol. 58, November 1, 1940, pages 774–779.

Hodgman, C. D.: Handbook of Chem. & Physics, 21st ed., 1936, pages 1451-2.

Roess et al.: Rv. Sc. Insts., July 1945, page 166.